United States Patent [19]

Proto et al.

[11] Patent Number: 5,453,595
[45] Date of Patent: Sep. 26, 1995

[54] NEEDLE BLANK FEEDING APPARATUS

[75] Inventors: George R. Proto, West Haven; Mark S. Buchter, Hamden, both of Conn.

[73] Assignee: United States Surgical Corporation, Norwalk, Conn.

[21] Appl. No.: 264,550

[22] Filed: Jun. 23, 1994

Related U.S. Application Data

[63] Continuation of Ser. No. 951,394, Sep. 25, 1992, Pat. No. 5,371,338.

[51] Int. Cl.$^6$ .................................................. B23K 26/00
[52] U.S. Cl. ........................ 219/121.68; 219/121.7; 219/121.82
[58] Field of Search .................... 219/121.68, 121.69, 219/121.82, 121.85, 121.16, 121.17, 121.31, 121.7

[56] References Cited

U.S. PATENT DOCUMENTS

| | | |
|---|---|---|
| 4,078,165 | 3/1978 | Tuttle . |
| 4,288,679 | 9/1981 | La Rocca . |
| 4,336,439 | 6/1982 | Sasnett et al. . |
| 4,501,312 | 2/1985 | Matsutani . |
| 4,700,043 | 10/1987 | Matsutani . |
| 4,857,696 | 8/1989 | Taeusch et al. . |
| 4,910,377 | 3/1990 | Matsutani et al. . |
| 4,935,029 | 6/1990 | Matsutani et al. . |
| 4,952,789 | 8/1990 | Suttie . |
| 4,976,727 | 12/1990 | Matsutani et al. . |
| 5,001,323 | 3/1991 | Matsutani et al. . |
| 5,012,066 | 4/1991 | Matsutani et al. . |
| 5,015,819 | 5/1991 | Neri et al. . |

FOREIGN PATENT DOCUMENTS

| | | |
|---|---|---|
| 0296776 | 12/1988 | European Pat. Off. . |
| 0407657 | 1/1991 | European Pat. Off. . |
| 0507227 | 10/1992 | European Pat. Off. . |
| 1-162590 | 6/1989 | Japan . |

OTHER PUBLICATIONS

Patent Abstracts of Japan, JP63171235, Nov. 17, 1988.
Japanese Abstract, JP60170590(1) Sep. 4, 1985.
Japanese Abstract, JP60184485(1), Sep. 19, 1985.

*Primary Examiner*—Mark H. Paschall

[57] ABSTRACT

A needle machining apparatus which presents a stock needle to a device for boring a hole in the needle. The apparatus also includes a needle feeding apparatus which provides high speed feeding of blank needles for the needle machining apparatus. A method for high speed feeding of needles for subsequent laser drilling is also disclosed.

11 Claims, 13 Drawing Sheets

NEEDLE BLANK FEEDING APPARATUS

This is a continuation of U.S. application Ser. No. 07/951,394 filed Sep. 25, 1992 now U.S. Pat. No. 5,371,338.

BACKGROUND OF THE INVENTION

1. Field of the Invention

The present invention relates to a needle machining apparatus which presents a stock needle to a device for boring a hole in the needle for subsequently securing a suture thereto. More particularly, the present invention relates to a high speed needle feeding apparatus for continuously feeding needle blanks for subsequent laser drilling.

2. Description of the Related Art

Surgical sutures are generally manufactured by first longitudinally drilling a hole through the end face of a blank stock needle, bending the needle to a desired curvature, inserting an appropriate suture into the hole and crimping or otherwise securing the suture material to the needle. Generally, there are numerous ways to drill or cut the hole in the end face. For example, the hole may be made by drill machining, electric discharge machining, laser beam machining, electron beam machining and the like. With the advent of microsurgical procedures, surgical sutures have become increasingly smaller in size, thus making it more complex and costly to manufacture the surgical needles. In particular, one aspect of surgical suture manufacturing which has become complex is drilling the hole in the needle.

A common procedure for making a hole in a surgical needle utilizes laser or electron beam machining. In order to utilize these methods in a production environment, techniques have been developed to continuously present a blank needle before the beam for cutting. One such technique includes presenting the blank needle from a rotary spool which is sequentially rotated to present an end face in line with the focal plane of the laser or electron beam. However, one drawback to this technique is that the rotating spool must stop before the beam is impinged on the needle. In order to operate properly the spool must come to a rest at precisely the same position aligned with the focus point of the beam. If the needle in the rotating spool is not aligned with the focus point of the beam, even by an infinitesimal amount, the centrality of the hole would be off center, thereby reducing the accuracy of the production process and ultimately resulting in increased defective quantities of needles. Currently, rotary spool systems are unable to obtain the precise positioning required for laser or electron beam machining. This lack of precision is magnified as the speed in which the blank needle is presented increases. As a result, the reliability and accuracy of rotary spool feeding systems is unacceptable in a high volume production environment.

Another technique utilized has been to bundle blank needles into a container, digitize an image of the needle faces in the bundle and move the laser or electron beam to focus sequentially on each needle before firing the beam. These types of beam machining devices also have drawbacks, such as the need to optically determine where each needle is and then move the beam to coincide with the longitudinal axis at the center of the needle. Such systems are complex and require additional steps in order to determine the precise position of each needle. As a result, the speed of producing sufficient quantities to satisfy production needs is decreased.

Therefore, a need exists for a precise needle blank feeding system which can be reliably operated at high speeds and which does not require movement of the laser or electron beam.

SUMMARY OF THE INVENTION

The present invention relates to an apparatus for presenting needle shanks to a device for boring a hole in the needle shank. The apparatus includes a frame, guide means secured to the frame for transferring the needle shank between a needle receiving position and a hole creating position, blocking means slidably secured to the frame for positioning the needle shank a predetermined distance from the hole boring device, pusher means slidably secured to the frame for sliding the needle shank to abut the blocking means, such that the needle shank is positioned from said hole boring device said predetermined distance, and jaw means slidably secured to said frame for maintaining the needle shank in said hole creating position. The invention also provides for a laser boring system having a laser operated in conjunction with the needle presenting apparatus. A method is disclosed for presenting the needle shanks for laser boring which utilizes the apparatus of the present invention.

The apparatus of the present invention permits needle blanks to be precisely and accurately positioned for end drilling. Advantageously, the apparatus sequentially advances and accurately positions needle blanks for end drilling at a very high repetition rate, which allows a high volume of needle blanks to be processed in a relatively short period. Indeed, with the apparatus of the present invention needle blanks are sequentially positioned for end drilling at a repetition rate approaching the cycle time of the laser. In addition to production volume considerations, the high repetition rate is also important because a laser is most efficient and reliable when operated at a consistent pulse cycle. Thus, a laser produces the most consistent needle holes when operated substantially continuously at a normal cycle of between about 1 Hz. and 10 Hz., preferably about 4 Hz. Prior to the present invention it has not been possible to accurately feed and position needle blanks at such rapid speeds.

BRIEF DESCRIPTION DRAWINGS

The features of the present invention will become more readily apparent and may be understood by referring to the following detailed description of an illustrative embodiment of the invention, taken in conjunction with the accompanying drawings, in which.

DETAILED DESCRIPTION OF THE PREFERRED EMBODIMENTS

Figure 1:
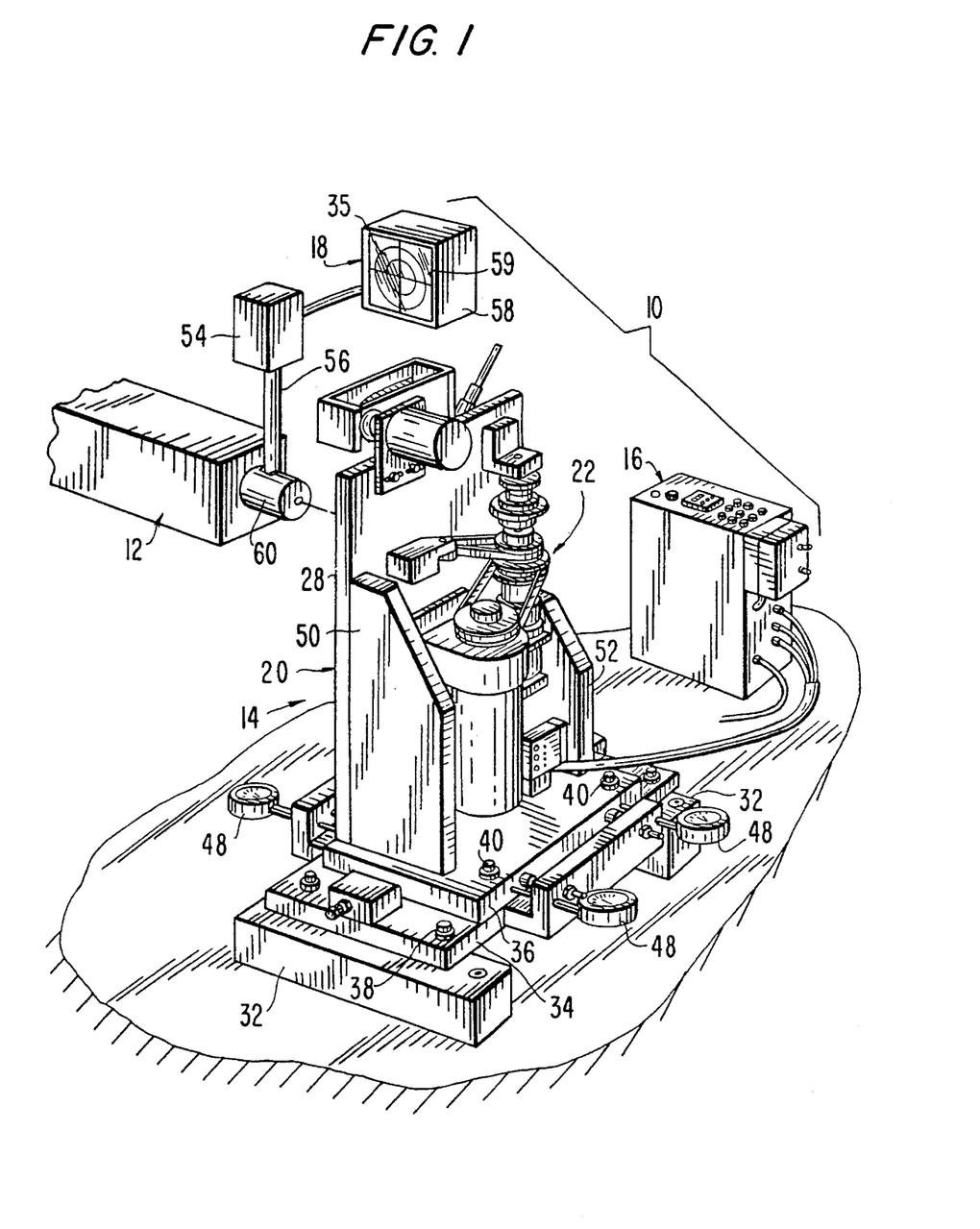
FIG. 1 is a perspective view from the rear of the needle machining system of the present invention.

Referring now in detail to the drawings, in which like reference numerals identify similar or identical elements throughout the several views, FIG. 1 illustrates the needle machining system 10 of the present invention which includes a hole making device 12, a needle feeding apparatus 14, a control system 16 and an imaging system 18. The hole making device 12 preferably comprises a laser, however, it should be understood that the hole making device may include a wide variety of machinery, such as, drill machinery, electric discharge machining devices and electron beam machining devices.

Figure 2:
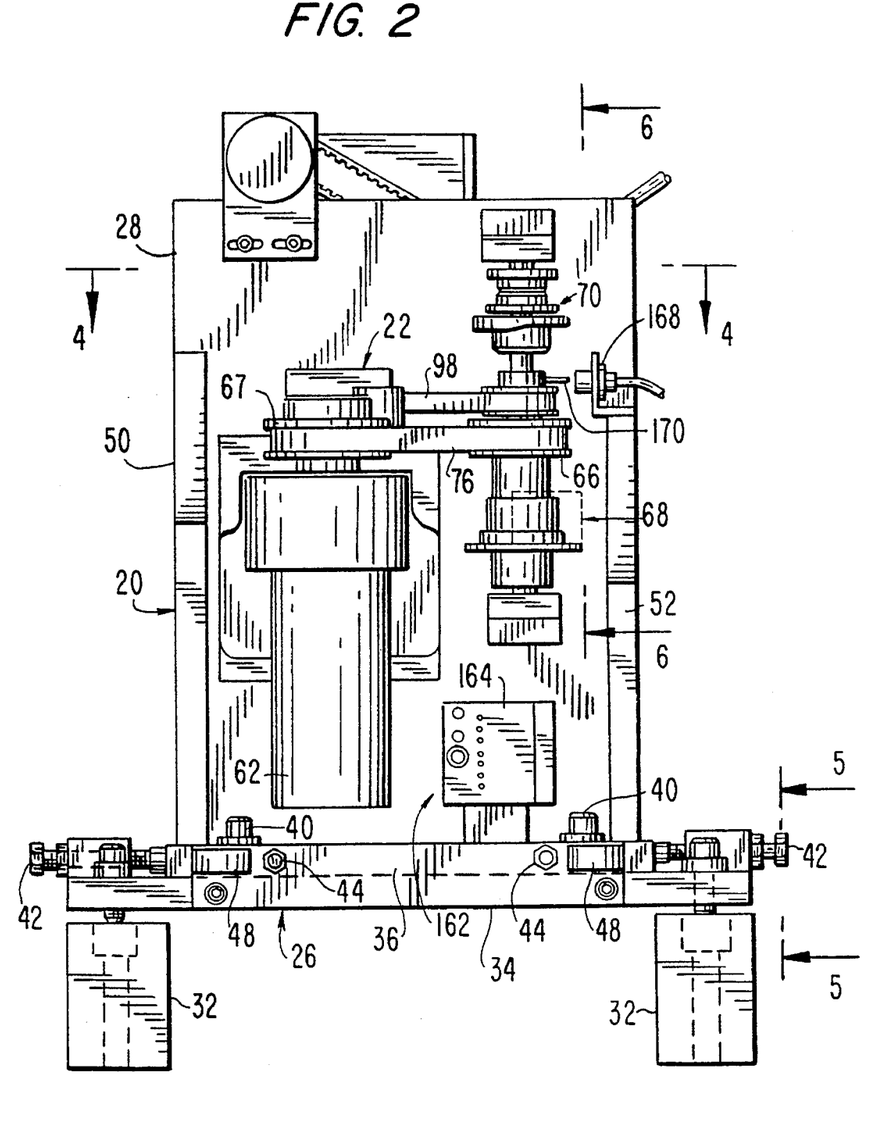
FIG. 2 is a rear view of a needle feeding apparatus which forms part of the system of FIG. 1, illustrating the primary drive system and the adjustable base assembly.
Figure 3:
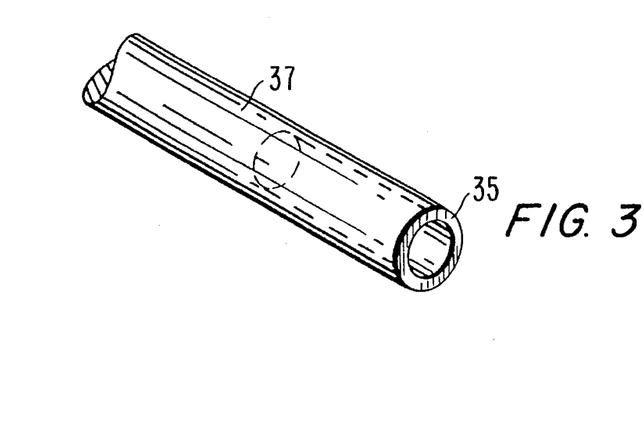
FIG. 3 is a perspective view of a needle shank machined by the needle machining system of FIG. 1.

Referring to FIGS. 1 through 6, the needle feeding apparatus 14 of system 10 includes frame 20, drive system 22, and needle positioning system 24. In the preferred embodiment, shown in FIGS. 2 and 6, frame 20 has adjustable base assembly 26, vertical support 28 secured to base 36 by side walls 50 and 52, and operational platform 30 secured to vertical support 28. Adjustable base assembly 26 is provided to support the operational components of needle feeding apparatus 14 and to provide proper alignment and adjustment of the position of the needle prior to drilling or machining the hole. Frame 20 is movable by adjusting the position of adjustable base assembly 26 to ensure that the hole is centered in the face 35 of the needle 37 and extends linearly therein a predetermined depth, as shown in FIG. 3. The depth of the hole may vary depending on the type of suture to be inserted therein and the diameter, length and composition of the needle.

Figure 4:
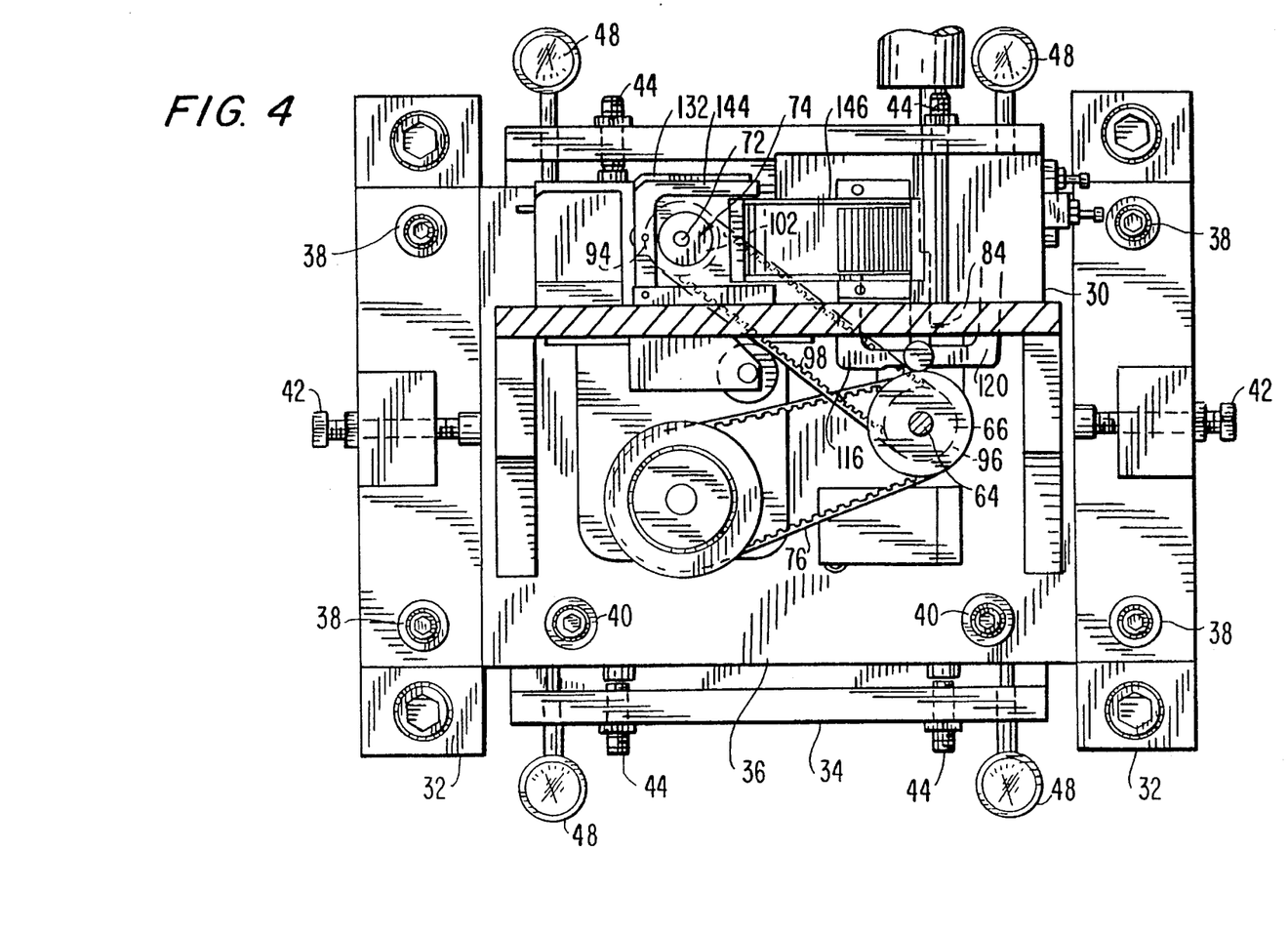
FIG. 4 is a top view, partially in cross-section, of the needle feeding apparatus taken along lines 4—4 of FIG. 2.
Figure 5:
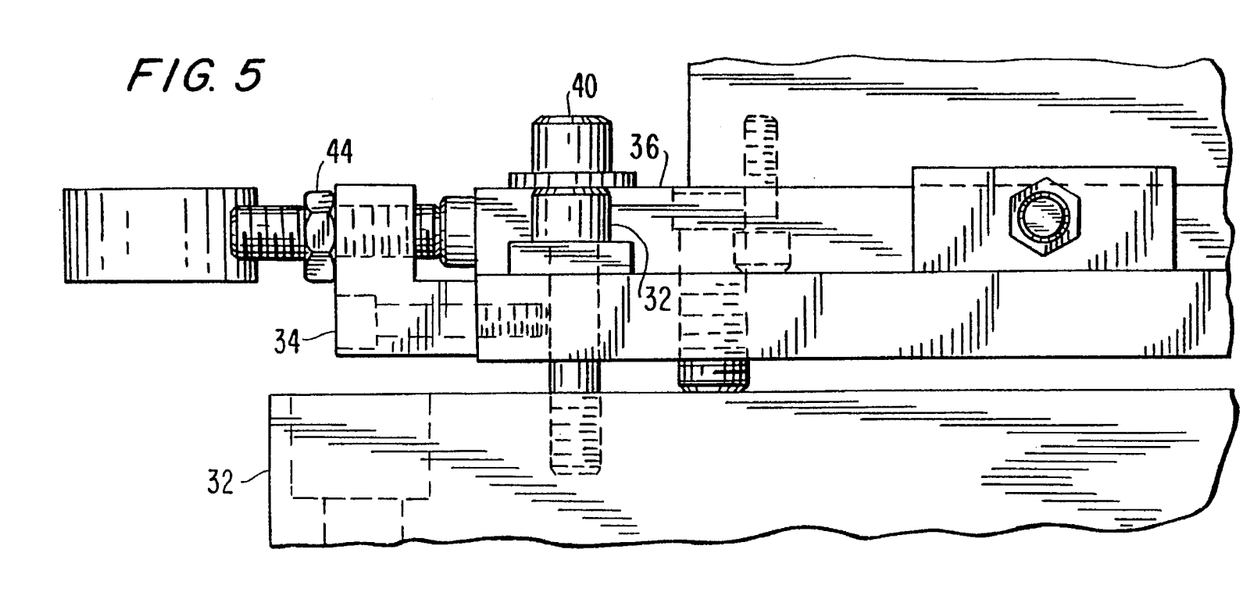
FIG. 5 is a left side view of a portion of the adjustable base assembly taken along lines 5—5 of FIG. 2.

Referring to FIGS. 2 and 4, adjustable base assembly 26 includes base support members 32, base retainer 34 and base 36 which provide for adjustment of the needle in five axes. Base retainer 34 is secured to base supports 32, with vertical adjusting members 38, while base 36 is slidably secured to base retainer 34 with set screws 40. An example of the five axes adjustment of adjustable base assembly 26 lies within the three dimensional rectangular coordinate system. The base is adjustable in the positive and negative x direction, the positive and negative y direction, the positive and negative z direction or any combination thereof. In addition, rotational adjustment is provided in the x-y plane and in the y-z plane. To illustrate and referring to FIG. 4, x-plane adjusting members 42 provide is left to right adjustment of base 36, while y-plane adjusting members 44 provide back and forth adjustment of base 36. As shown in FIG. 5, vertical adjustment of base 36 is provided by vertical adjusting members 38. Rotational movement of base 36 is provided by properly adjusting y-plane adjusting members 44 for x-y plane rotation and/or vertical adjusting members 38 for y-z plane rotation. Preferably, the various adjusting members are screws which cause the corresponding motion as described. However, bolts, micrometers, and the like may be utilized as aligning members. It should be noted that the underlying principle in adjusting base 36 is to properly position the longitudinal axis of the needle within the focal plane or cutting axis of the laser, so that the hole is substantially centered within needle 37, as shown in FIG. 3. Gauges 48 may be provided to ensure that base 36 is symmetrically adjusted in each axis the same distance.

To supplement the positioning of the needle in the hole creating position an imaging system 18 is provided to assist in the initial adjustment of the needle. As shown in FIG. 1, imaging system 18 generally includes video camera 54, lens assembly 56 and video monitor 58. In the preferred embodiment, lens assembly 56 is connected to focal lens 60 of laser 12 so that the focal plane of lens assembly 56 coincides with the focal plane of laser 12. Video camera 54 is connected to lens assembly 56 and electrically connected to video monitor 58. Cross-hairs 59 superimposed on the video image correspond to the focus point of laser 12. As a result, the displayed image on video monitor 58 includes needle face 35 and cross-hairs 59, as shown in FIG. 1. In this configuration, imaging system 18 allows an operator to observe the needle face 35 in the hole creating position and adjust the frame, as discussed above, to align the longitudinal axis of the needle with the center point of the intersecting crosshairs.

Drive system 22 Will now be described with reference to FIGS. 2, 6, 8 and 9. Preferably, drive system 22 includes: a) motor 62 secured to vertical support 28; b) primary drive shaft 64 rotatably secured to support 28 having primary drive wheel 66 secured thereto; c) clutch assembly 68 operatively connected to primary drive shaft 64; d) primary cam system 70 connected to primary drive shaft 64; e) secondary drive shaft 72 operatively connected to primary drive shaft 64; and f) secondary cam system 74 connected to secondary drive shaft 72.

Referring to FIG. 2, motor 62 rotates primary drive wheel 66 via primary drive belt 76 connected between primary drive wheel 66 and motor drive wheel 67. Although primary drive belt 76 is utilized to transfer the rotational movement of motor 62 to primary drive shaft 64 any other known device may be used to transfer the rotational movement, such as gears, chain links and the like. The rate at which the motor rotates varies with the operational speed of needle machining system 10, which is regulated by control system 16. For example, if a laser is utilized to make the hole, the motor should rotate at a speed which allows maximum use of the laser while maintaining the accuracy of needle feeding apparatus 14. Thus, if the laser is programmed to fire at a rate of 4 Hertz (Hz), the motor must rotate so that 4 needles per second are positioned in the hole creating position. Similarly, if the laser is programmed to operate at 2 Hz, the motor must rotate so that 2 needles per second are positioned in the hole creating position.

Figure 6:
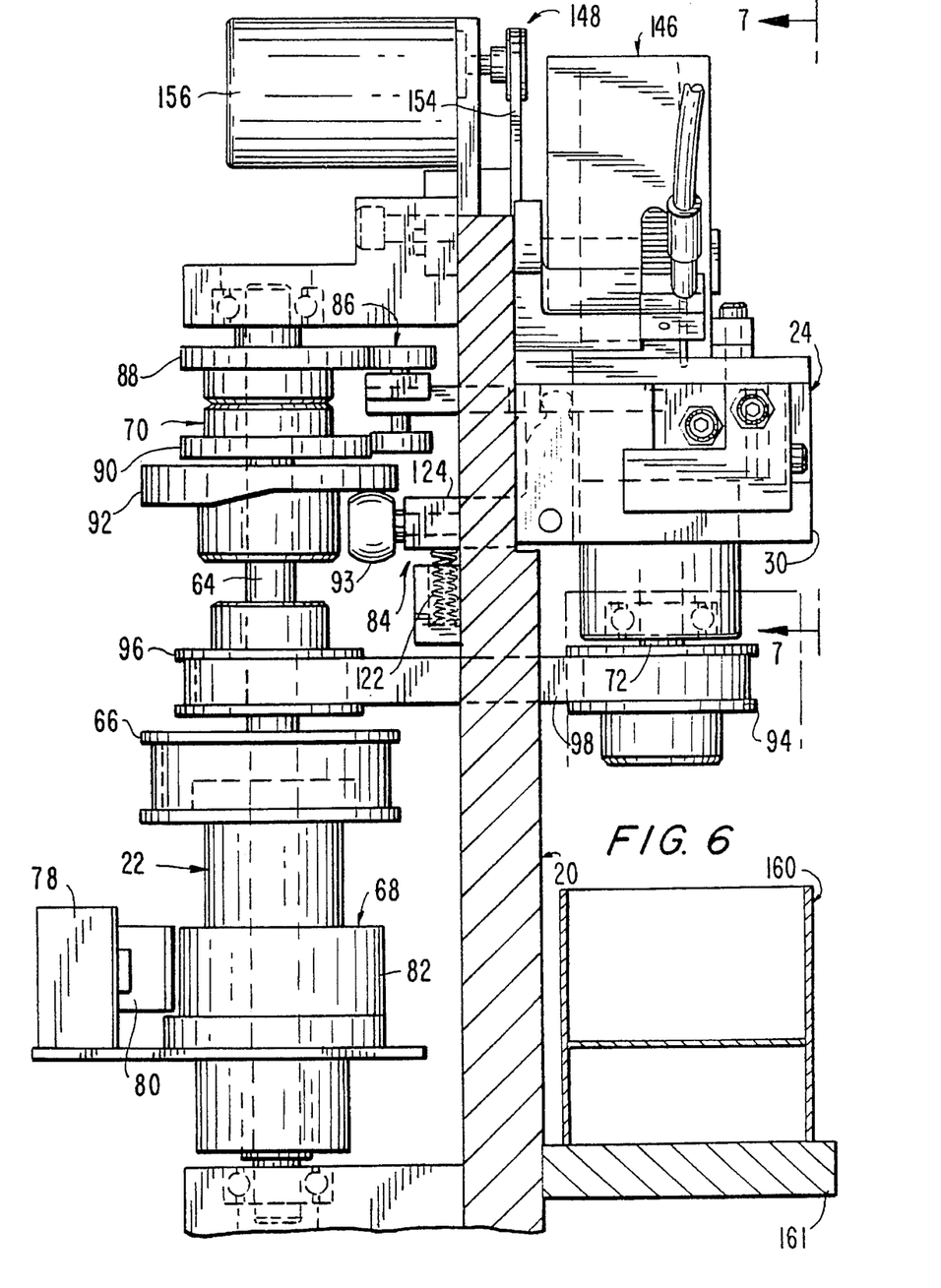
FIG. 6 is a left side view, partially in cross-section, of the primary drive system taken along lines 6—6 of FIG. 2.

Referring to FIG. 6, clutch assembly 68 is provided to transfer rotational movement of primary drive wheel 66 to primary drive shaft 64. The clutch assembly is shown in phantom in FIG. 2 for the purpose of clearly illustrating the primary drive shaft and its associated components, however, the clutch assembly is shown in detail in FIG. 6. Preferably, clutch assembly 68 includes solenoid 78, solenoid arm 80 and brake arm 82. However, other types of known clutch mechanisms are contemplated. To activate clutch assembly 68 solenoid 78 is energized, preferably from a 24 volt electrical signal from control system 16, which indicates that the laser is ready to activate. Energized solenoid 78 causes solenoid arm 80 to retract so as to disengage from brake arm 82. Release of brake arm 82 allows primary drive shaft 64 to rotate until solenoid 78 is deactivated. Deactivation of solenoid 78 causes solenoid arm 80 to protract and engage brake arm 82 so as to inhibit primary drive shaft 64 from rotating.

Figure 8:
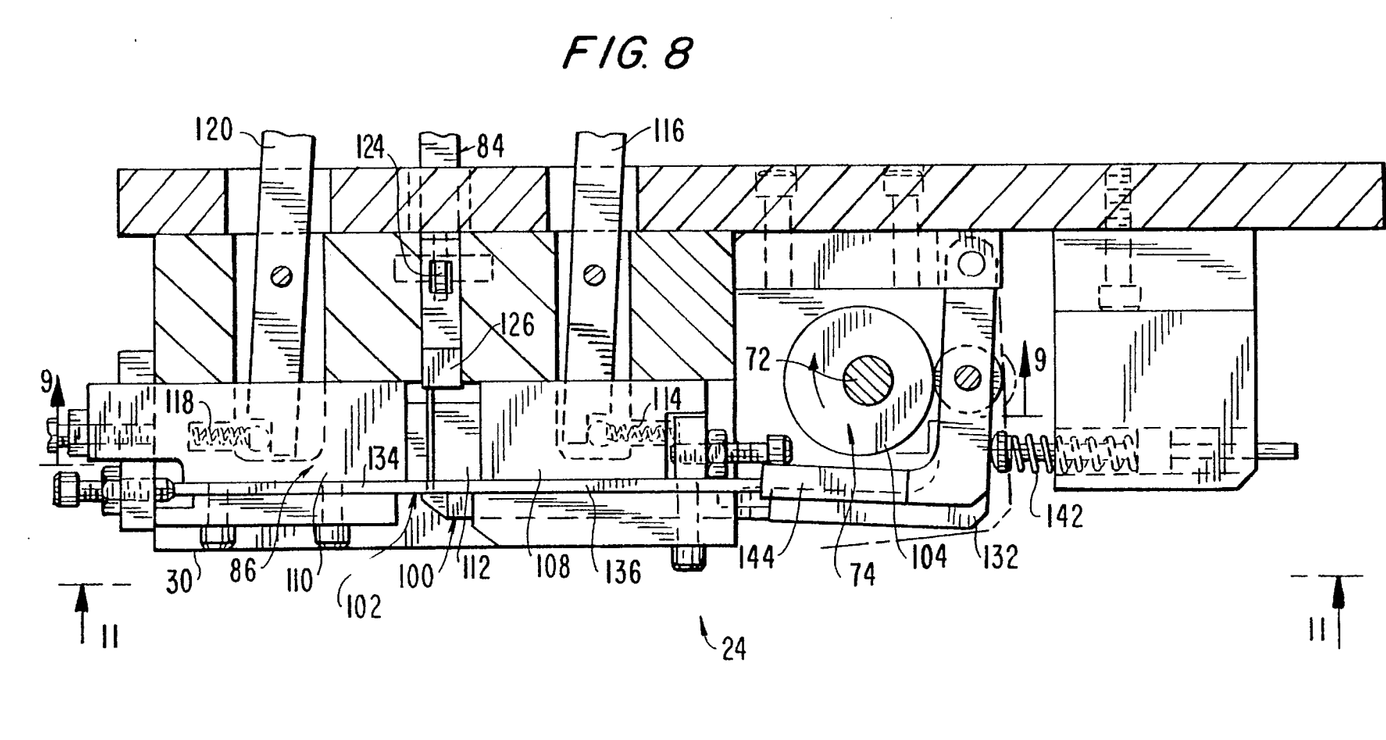
FIG. 8 is a top view, partially in cross-section, of the needle positioning system taken along lines 8—8 of FIG. 7.

Referring to FIGS. 6 and 8, primary cam system 70 is secured to primary drive shaft 64 to translate the rotational movement of primary drive shaft 64 to the reciprocating movement of pusher system 84 and guide assembly 86. Primary cam system 70 includes upper primary cam 88, intermediate primary cam 90 and lower primary cam 92, where upper primary cam 88 and intermediate primary cam 90 reciprocate guide assembly 86 and lower primary cam 92 reciprocates pusher system 84.

Figure 9:
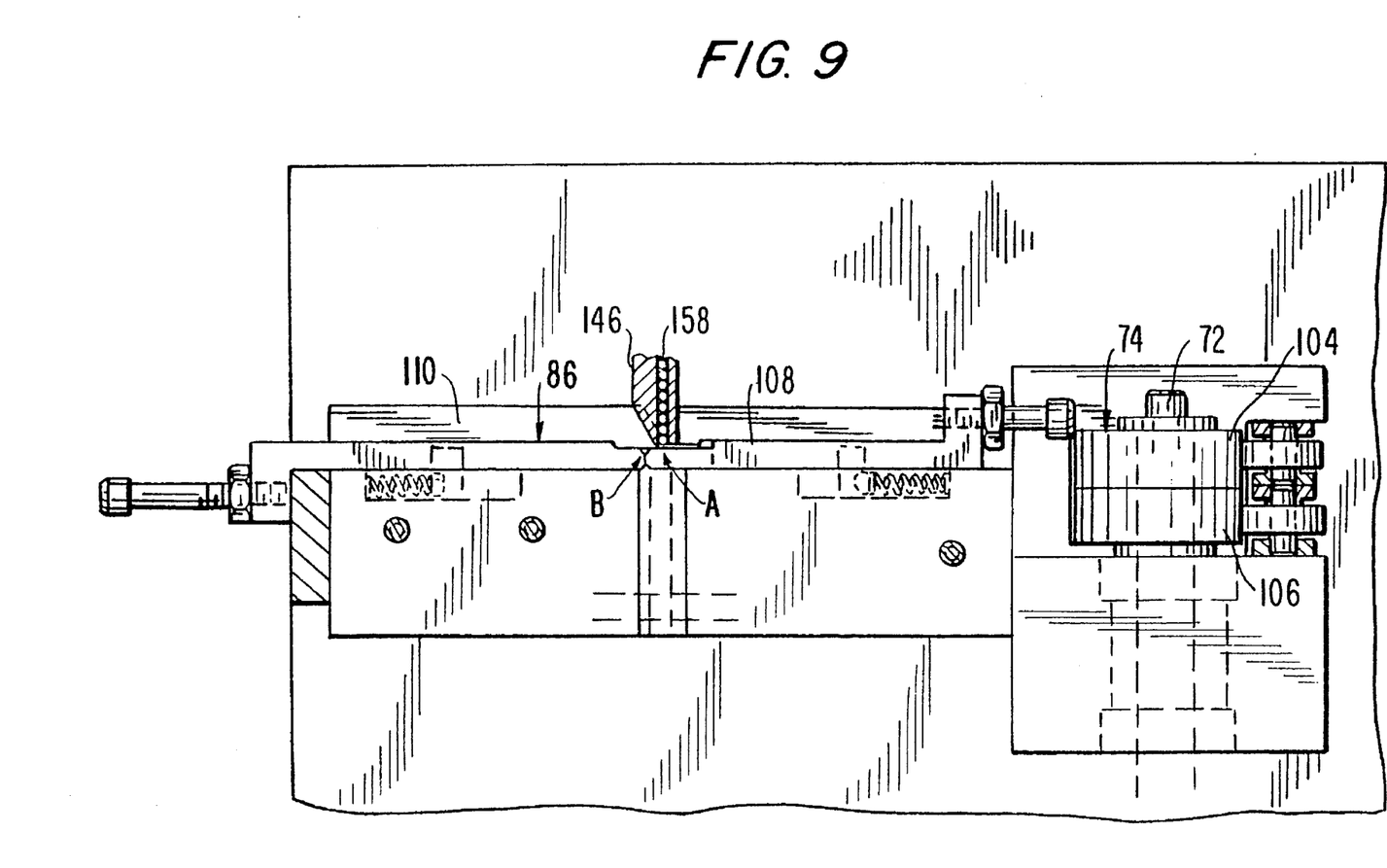
FIG. 9 is a front view, partially in cross-section, of the needle positioning system taken along lines 9—9 of FIG. 8.

Secondary drive shaft 72 is rotatably secured to vertical support 28 and has secondary drive wheel 94 secured thereto. Secondary drive wheel 94 is operatively connected to intermediate drive wheel 96 on primary drive shaft 64, so as to transfer rotational movement of primary drive shaft 64 to secondary drive shaft 72. Typically, drive belt 98 which passes through vertical support 28, is employed to connect primary drive shaft 64 to secondary drive shaft 72. However, other known techniques may be utilized to transfer the rotational movement between the shafts, such as gears, chain links and the like.

Referring to FIGS. 8 and 9, secondary cam system 74 is secured to secondary drive shaft 72 to translate the rotational movement of secondary drive shaft 74 to the reciprocating movement of blocking system 100 and jaw assembly 102. Secondary cam system 74 includes upper secondary cam 104 and lower secondary cam 106, where upper secondary cam 104 reciprocates jaw assembly 102 and lower secondary cam 106 reciprocates blocking system 100.

The needle positioning system 24 will now be described with reference to FIGS. 6 through 11. In the preferred embodiment, shown in FIG. 10, needle positioning system 24 includes guide assembly 86, blocking system 100, pusher system 84 and jaw assembly 102, which are slidably secured to operational platform 30.

Referring to FIG. 8, guide assembly 86 includes carriage 108 and guide member 110. Carriage 108 is slidably secured to guide track 112 and reciprocates between a needle receiving position and a hole creating position. Guide member 110 is slidably secured within guide track 112 at a point adjacent the hole creating position and in opposition to carriage 108. In the preferred embodiment, carriage 108 and guide member 110 are fabricated from an aluminum-bronze alloy. If necessary or desirable a lubricant may be added to carriage 108, guide member 110 and/or guide track 112 to provide lubrication for guide assembly 86. However, it is also contemplated that guide assembly 86 may be fabricated from materials, such as an oil or other lubricant impregnated material, which may be used in conjunction with a lubricating substance to assist the sliding motion.

As noted above and referring to FIGS. 6 and 8, reciprocating movement of carriage 108 is caused by primary cam system 70. Cooperation between upper primary cam 88 and carriage spring 114 causes carriage arm 116 to reciprocate. Reciprocating movement of carriage arm 116 causes carriage 108 to reciprocate between the needle receiving position and the hole creating position. Reciprocating movement of guide member 110 is also caused by primary cam system 70, however, guide member 110 is reciprocated between the hole creating position in opposition to carriage 108 and an open position in which guide member 110 is displaced from the hole creating position. To illustrate, cooperation between intermediate primary cam 90 and guide spring 118 causes guide arm 120 to reciprocate. Reciprocating movement of guide arm 120 causes guide member 110 to reciprocate between the hole creating position and the open position.

The needle receiving position represented by the letter "A" in FIG. 9, is the plane along guide track 112 where a needle is supplied to carriage 108. The hole creating position on the other hand, is the plane along guide track 112 where the needle is positioned for subsequent drilling, as shown by the letter "B" in FIG. 9. Generally, the supplied needle is oriented so that the longitudinal axis of the needle is substantially perpendicular to the longitudinal axis of guide track 112 with one face of the needle positioned toward the laser. It should be noted, however, that the requirement for orientation of the longitudinal axis of the needle is such that the needle face coincides with the focus point or cutting point of the laser so that the hole created is centered on the front face of the needle and extends linearly into the needle, as shown in FIG. 3.

Referring again to FIGS. 6 and 8, pushing system 84 is provided to push the needle along its longitudinal axis in the hole creating position to a predetermined distance from laser 12. Pushing the needle toward laser 12 enables jaw assembly 102 to grasp the needle, while the predetermined distance between the needle and laser 12 ensures the precision of the depth and shape of the hole and, in some instances, prevents overheating and discoloration of the needle when drilling. As noted above, the pushing system 84 is activated by lower primary cam 92 of primary cam system 70. To illustrate, cooperation between lower primary cam 92 and wheel 93 against the biasing force of pusher spring 122 causes pusher pin 124 to vertically reciprocate. Reciprocating movement of pusher pin 124 causes pusher bar 126 to reciprocate between the hole creating position and an open position displaced from the hole creating position.

Figure 11:
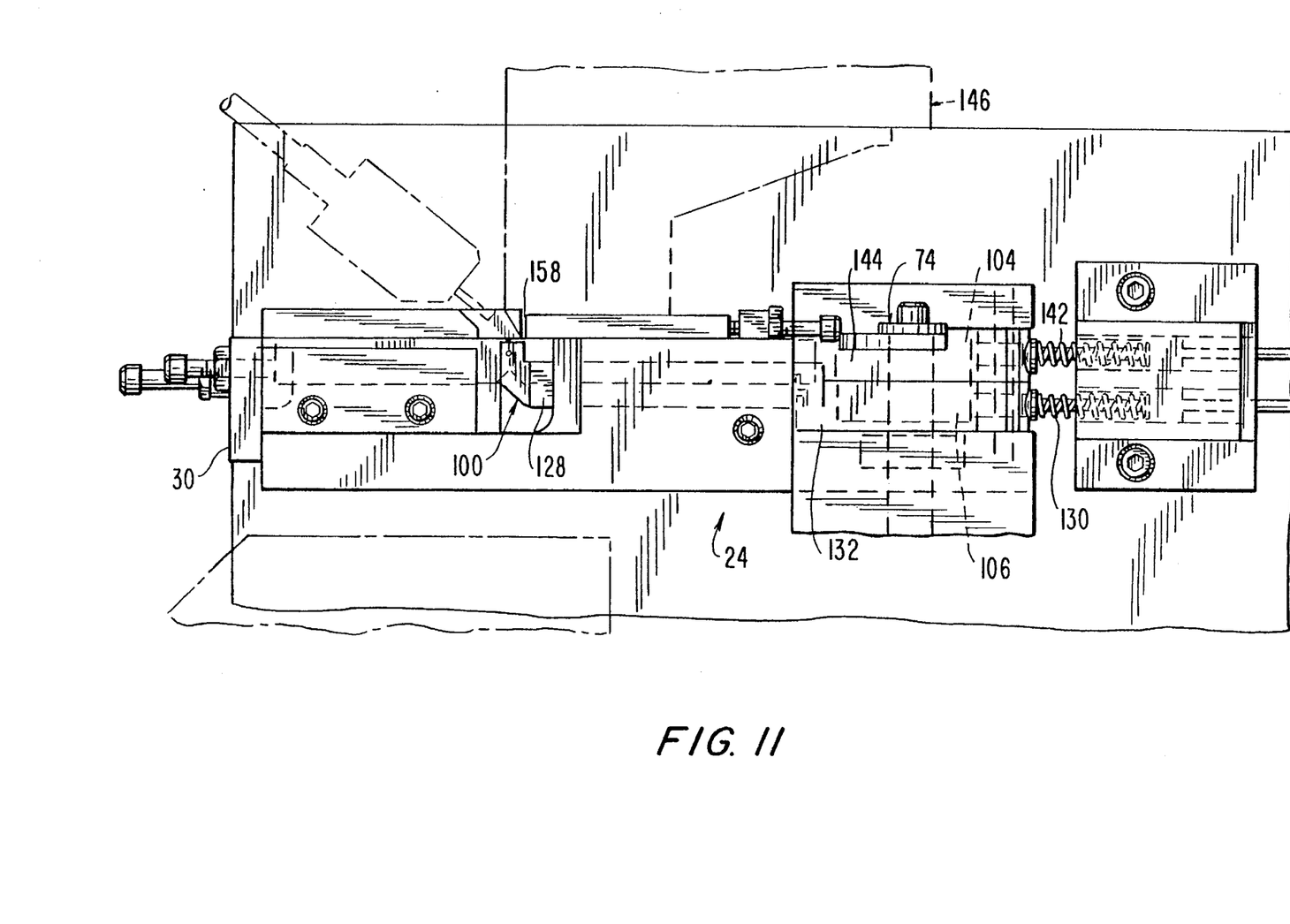
FIG. 11 is a front view of the needle positioning system taken along lines 11—11 of FIG. 8.

Referring to FIGS. 8 and 11, blocking system 100 is provided to prevent the needle from extending a predetermined distance beyond jaw assembly 102 and guide assembly 86 in the direction of the laser. As a result, pusher system 84 may push the needle toward the laser a maximum distance which abuts blocking system 100. In the preferred embodiment, the blocking system includes a shutter 128 positioned adjacent to jaw assembly 102 and slidably secured to operational platform 30. Cooperation between lower secondary cam 106 of secondary cam system 74 and shutter spring 130 causes shutter arm 132 to reciprocate. Reciprocating movement of shutter arm 132 causes shutter 128 to reciprocate along a path parallel to guide 112, between an intersecting position, where shutter 128 intersects the focal or cutting plane of the laser, and a retracted position where shutter 128 no longer intersects the laser's focal or cutting plane.

Figure 10:
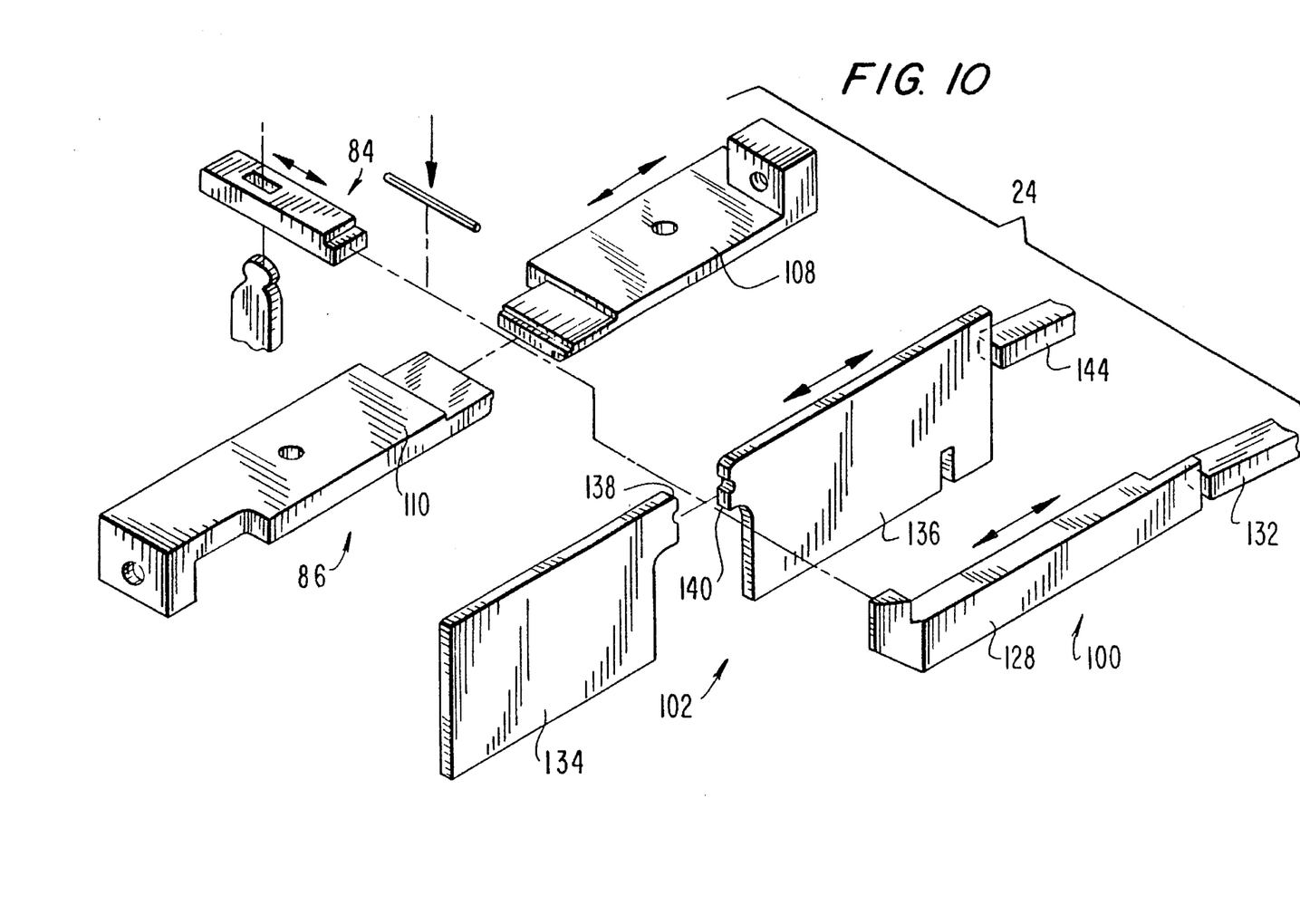
FIG. 10 is a perspective view with parts separated, of the needle positioning system of FIG. 7, showing the jaw assembly, pusher assembly, guide assembly, and the blocking system.

Referring to FIGS. 8, 10 and 11, jaw assembly 102 includes a pair of jaws 134 and 136 which are preferably fabricated from carbide, to enable jaw assembly 102 to withstand arcing caused when the laser beam is impinged on the needle shank without deteriorating. Fixed jaw 134 is rigidly secured to operational platform 30 adjacent guide 112 so as to have fixed gripper 138 in communication with the plane of the hole creating position. Movable jaw 136 is slidably secured to operational platform 30 adjacent guide 112 so as to have movable gripper 140 slide into communication with the plane of the hole creating position in opposition to fixed gripper 138. As noted above, jaw assembly 102 is activated by upper secondary cam 104 of secondary cam system 74 and maintains the needle in the hole creating position until the hole has been created. To illustrate, cooperation between upper secondary cam 104 and jaw spring 142 causes jaw arm 144 to reciprocate. Reciprocating movement of jaw arm 144 causes movable jaw 136 to move between an open position which allows an existing needle between the jaws to fall through, and a closed position which grasps the new needle to be drilled.

Figures 7, 13:
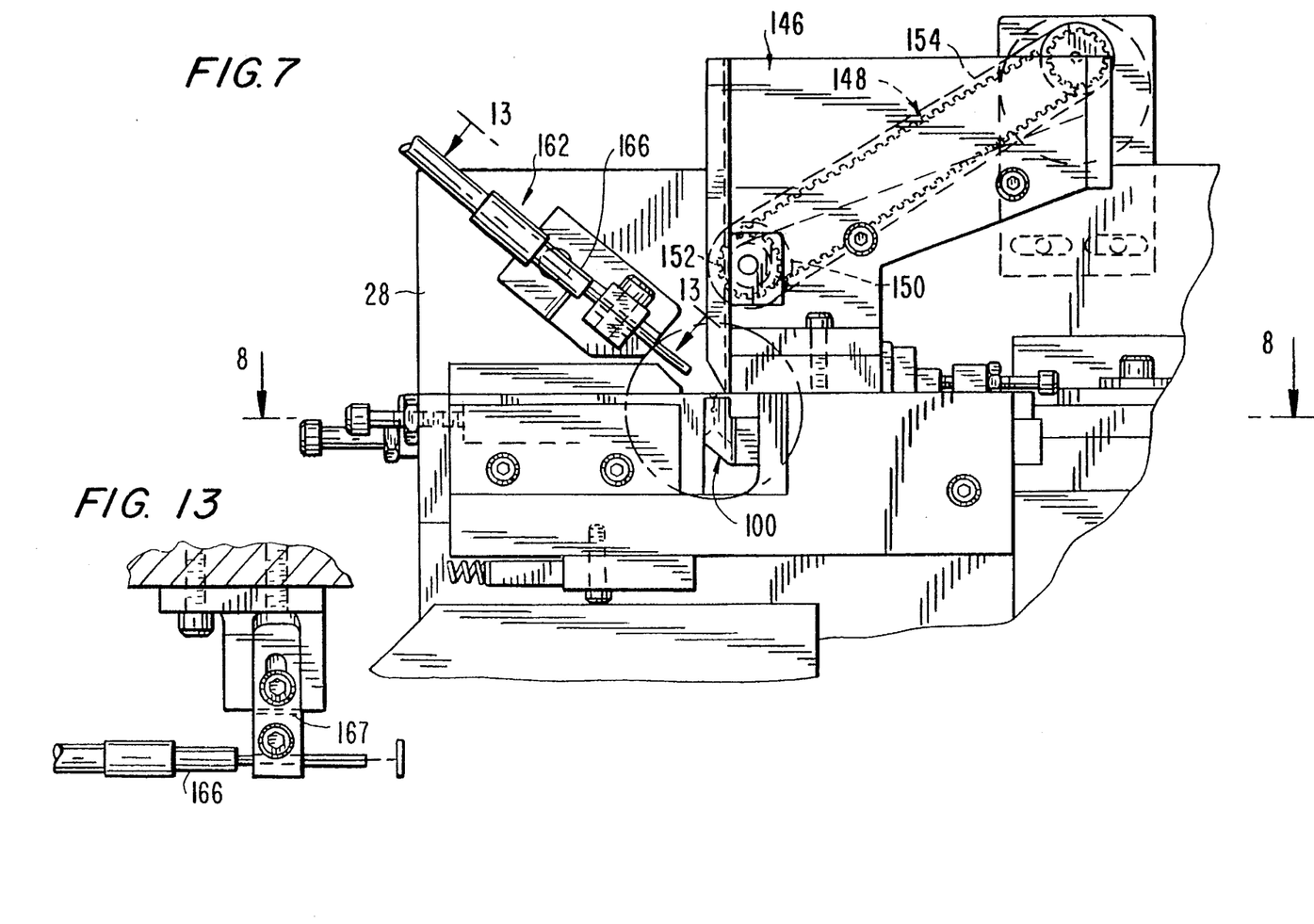
FIG. 7 is a front view of a portion of the needle positioning system of the needle machining system of FIG. 1 taken along lines 7—7 of FIG. 6.
FIG. 13 is a top view, partially in cross-section, of a portion of the needle detection system taken along lines 13—13 of FIG. 7.

Turning to FIGS. 6, 7 and 9, supply hopper 146 is provided to continuously supply blank needles to guide assembly 86. In the preferred embodiment, supply hopper 146 is secured to operational platform 30 adjacent the needle receiving position of guide assembly 86 and continuously supplies needles thereto. However, supply hopper 146 may be releasably secured to platform 30 such that supply hopper 146 can be replaced with a new full hopper assembly after the existing supply of needles has depleted. For example, supply hopper 146 may be secured to platform 30 by a track which receives flanges (not shown) positioned on supply hopper 146, to frictionally secure supply hopper 146 to platform 30. Another example for releasably securing supply hopper 146 to platform 30 may be to provide a snap-lock mechanism in which a first flange on supply hopper 146 snaps into a corresponding channel in platform 30, while a second flange on supply hopper 146 snaps into a corresponding channel in a spring loaded member secured to platform 30. The spring loaded member would allow an operator to release the supply hopper from the platform by simply retracting the spring loaded member so that the second flange is exposed, thus enabling the operator to tilt or pivot the supply hopper and disengage the first flange.

Figure 12:
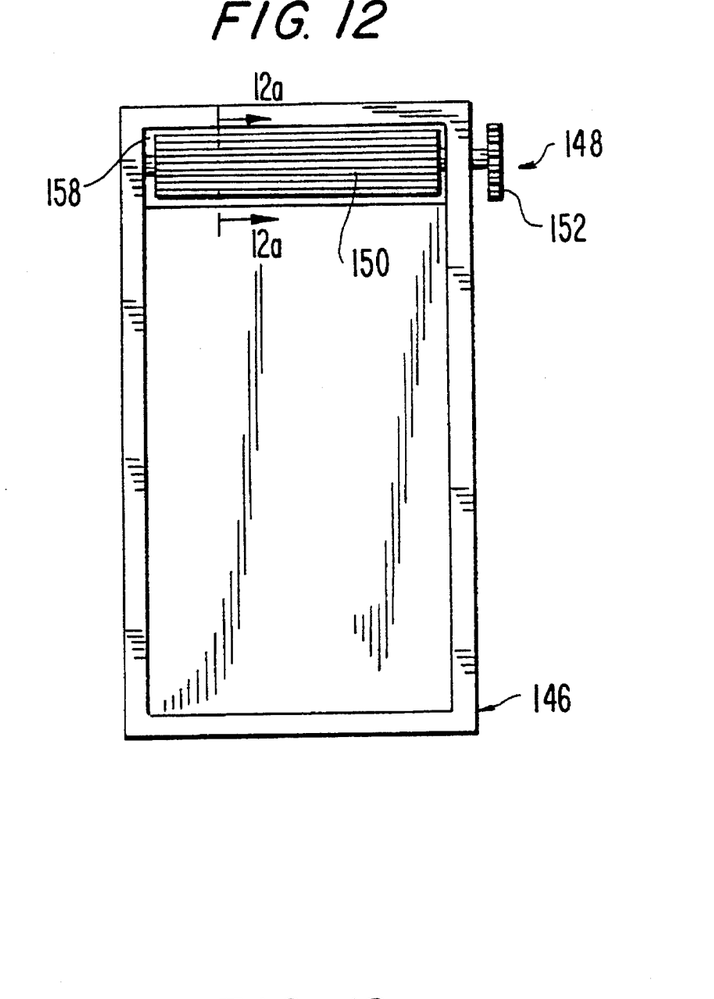
FIG. 12 is a top plan view of the needle blank supply hopper assembly of FIG. 7, illustrating a portion of an anti-binding system.
Figure 12A:
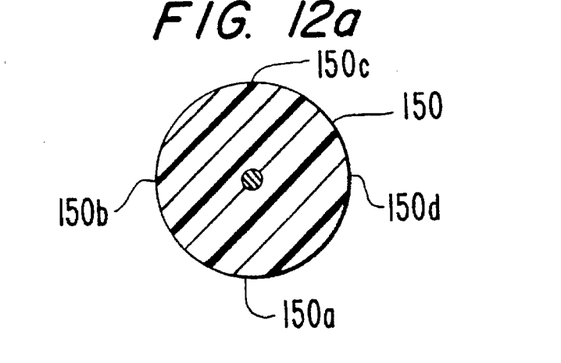
FIG. 12a is a cross-sectional view of the cycle wheel which forms part of the anti-binding system taken along lines 12A—12A of FIG. 12.
Figure 14A:
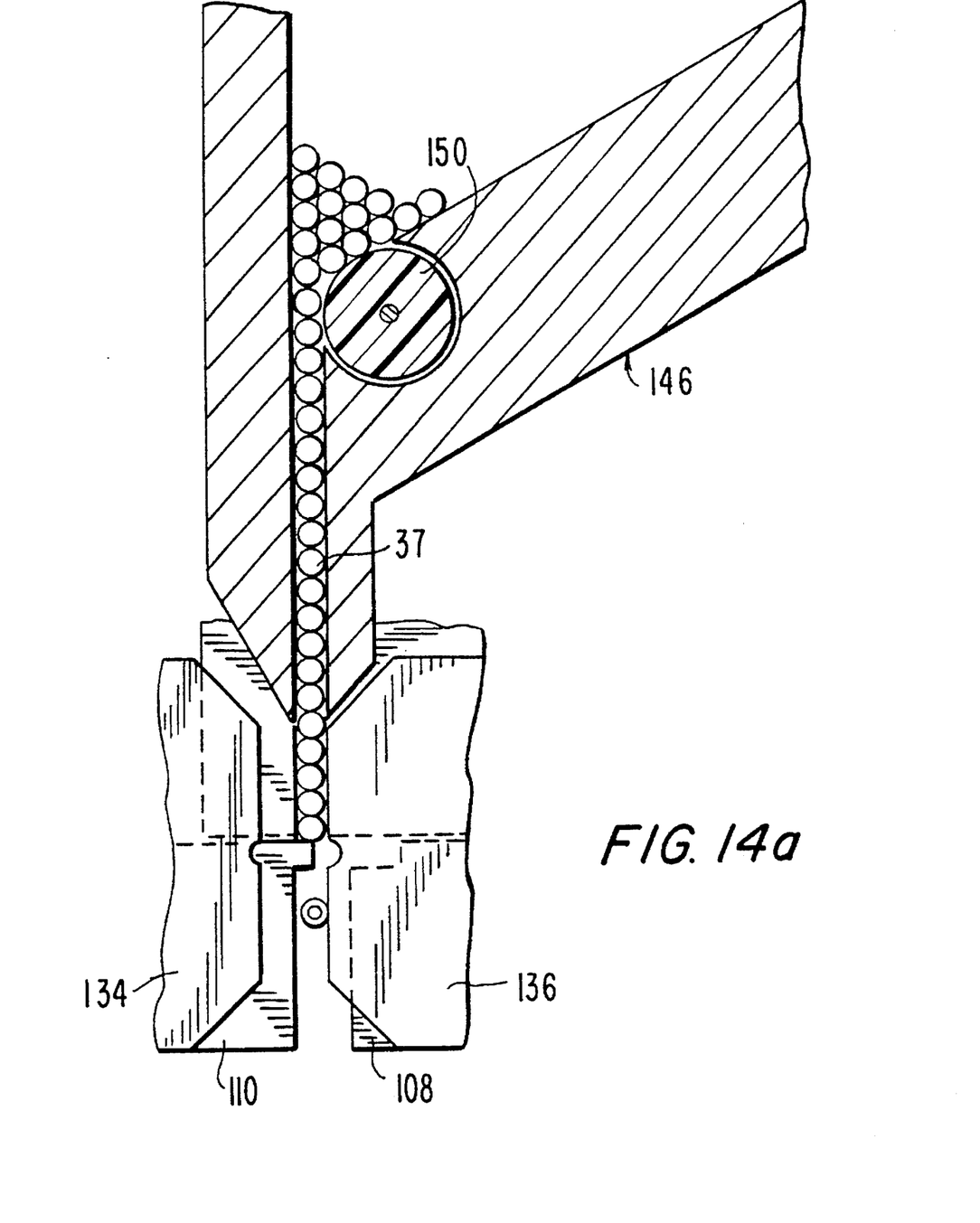
FIG. 14a is a front view, partially in cross section, of the needle positioning system of FIG. 7 and a portion of the supply hopper assembly of FIG. 12, illustrating a row of needle blanks in position prior to creation of the hole, and a needle blank being released after creation of the hole.

Referring to FIGS. 6, 7 and 12, supply hopper 146 is also provided with an anti-binding system which prevents needles within supply hopper 146 from binding at the point where the needles are supplied to guide assembly 86. Preferably, anti-binding system 148 includes cycle wheel 150, gear 152, drive means such as chain 154 and hopper motor 156. Cycle wheel 150 is rotatably secured within supply hopper 146 at a point adjacent to needle supply opening 158, thereby ensuring continuous and sequential gravity feeding of needles through needle supply opening 158, as shown in FIGS. 12, 12a and 14a. Gear 152 is secured to cycle wheel 150 on the exterior of supply hopper 146 and is operatively connected to hopper motor 156 by drive chain 154. Hopper motor 156 continuously rotates cycle wheel 150 in a direction opposite the direction needles are supplied to guide assembly 86, i.e., a counter-clockwise direction, which prevents needles from building-up and binding at needle supply opening 158. Preferably, cycle wheel 150 is a twenty-four sided, about one-half inch diameter wheel which is fabricated from a polyurethane material to prevent the needles from binding at needle supply opening 158, as shown in FIG. 14a. Utilization of a polyurethane material also prevents excessive marring of the needle shank surface. However, cycle wheel 150 may be fabricated from other suitable materials such as rubber.

To illustrate the dimensioning of cycle wheel 150, FIG. 12a shows cycle wheel 150 divided into four quadrants having six sides within each quadrant. As shown, the first quadrant begins with side below side 150d and ends with side 150a the sixth side. The second quadrant begins with the side to the left of side 150a and ends with side 150b, the twelfth side. The third quadrant begins with the side above side 150b and ends with side 150c, the eighteenth side. The fourth quadrant begins with the side to the right of said 150c and ends with side 150d, the twenty fourth side. However, cycle wheel 150 may be in other known configurations which prevent binding of the needle at the needle supply opening.

Referring again to FIG. 6, receiving hopper 160 may also be provided to receive the needles after the hole has been created therein. Receiving hopper 160 is releasably secured to frame 20 at a point aligned in communication with the hole creating position. Preferably, receiving hopper 160 is releasably secured to frame by positioning receiving hopper 160 on platform 161 secured to frame 20, so as to releasably maintain receiving hopper 160 in communication with the hole creating position. After a hole has been created in a needle, movable jaw 136 is moved to release the needle, which drops by gravity into receiving hopper 160.

Referring again to FIG. 1, control system 16 is connected to laser 12 and needle feeding apparatus 14 and provides control signals thereto. Preferably, control system 16 is programmable which enables the operator to set the desired operational speed of needle feeding apparatus 14 and laser 12. An example of a suitable control system includes a GE-Fanuc 9030 Programmable Controller, a LCD display manufactured by Horner Electric and numerous control switches and indicators. In order to properly operate, the timing for activating laser 12 and needle feeding apparatus 14 should be synchronized so that the laser cannot activate until the needle is present in the hole creating position. To accomplish this, it is preferred that the operating frequency of the laser be provided by the control system. For example, if the desired operating speed of the system is 240 needles per minute (4 Hz) control system 16 will supply a 4 Hz signal to the laser. Control system also activates solenoid 78, shown in FIG. 6, so that the operation of needle feeding apparatus 14 is synchronized with the firing of the laser. As noted above, control system 16 also provides the variable voltage to motor 62, shown in FIG. 2.

Referring to FIGS. 2, 7 and 13, it is also preferred that needle detecting system 162 be provided to ensure that a needle is present in the hole creating position prior to activating the laser. When no needle is present, needle detecting system 162 inhibits the laser from activating so that the laser beam does not accidentally impinge the mechanical structure of needle feeding apparatus 14. Preferably, needle detecting system 162 includes photo proximity switch 164 and photo sensor 166 connected to proximity switch 164. When activated, proximity switch 164 sends a signal to control system 16 so as to inhibit the laser from activating if a needle is not present. Photo sensor 166 is secured to vertical support 28 by bracket 167 so that photo sensor 166 is positioned within close proximity to the hole creating position to detect a needle positioned in the hole creating position.

An operation cycle of needle feeding apparatus 14 will be discussed with reference to FIGS. 6 and 8. Initially, solenoid 78 retracts solenoid arm 80 which allows clutch assembly 68 to activate. Activation of clutch assembly 68 causes primary drive shaft 64 to rotate. Rotational movement of primary drive shaft 64 causes primary drive wheel 66 and primary cam system 70 to rotate. Rotational movement of intermediate drive wheel 96 rotates secondary drive shaft 72 and ultimately secondary cam system 74. The timing pattern of the actuation of the cam systems is as follows: upper secondary cam 104 of secondary cam system 74 initially causes jaw assembly 102 to open while upper primary cam 88 and intermediate primary cam 90 of primary cam system 70 causes guide assembly 86 to open. At this point any needle which may be in the hole creating position will be released and subsequently fall, shown in FIG. 14a, into the receiving hopper.

Figure 14B:
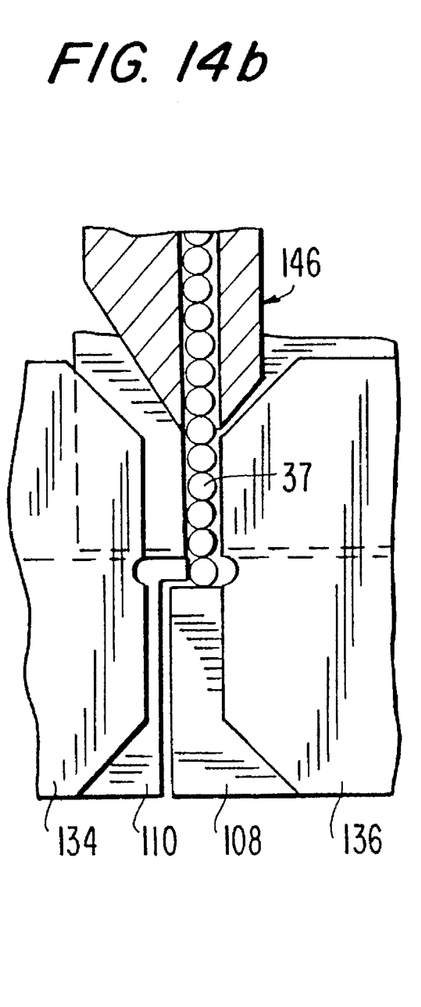
FIG. 14b is a front view similar to FIG. 14a, illustrating the next needle blank in position in the needle carriage prior to transfer to the hole creation position.
Figure 14C:
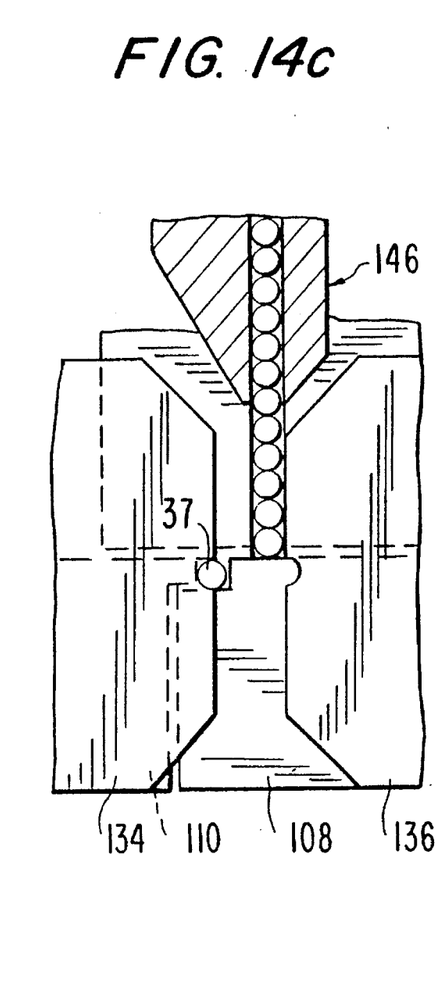
FIG. 14c is a front view similar to 14b, after the needle carriage has transferred the needle to one jaw in the hole creation position, prior to creation of the hole.

Once jaw assembly 102 and guide assembly 86 have opened, lower primary cam 92 of primary cam system 70 causes pushing system 84 to retract from the hole creating position. Blocking system 100 then slides along platform 30 adjacent jaw assembly 102 to intersect the hole creating position in response to lower secondary cam 106. In the intersecting position, blocking system 100 prevents the needle from extending beyond guide assembly 86 and jaw assembly 102 a predetermined distance, as noted above. At this point, guide assembly 86, in response to upper and intermediate cams 88 and 90 respectively, moves to the needle receiving position, to receive a new needle from supply hopper 146, as shown in FIG. 14b. Guide assembly 86 continues to move with the needle engaged therein until the needle is positioned at least partially in the hole creating position, as shown in FIG. 14c. Pushing system 84 then advances towards jaw assembly 102 to push the needle to the desired distance from the laser drill, as noted above. In the preferred embodiment, pushing system 84 advances the needle to abut blocking system 100 so that the end face of the needle is positioned a predetermined distance from the laser, as noted above.

Figure 14D:
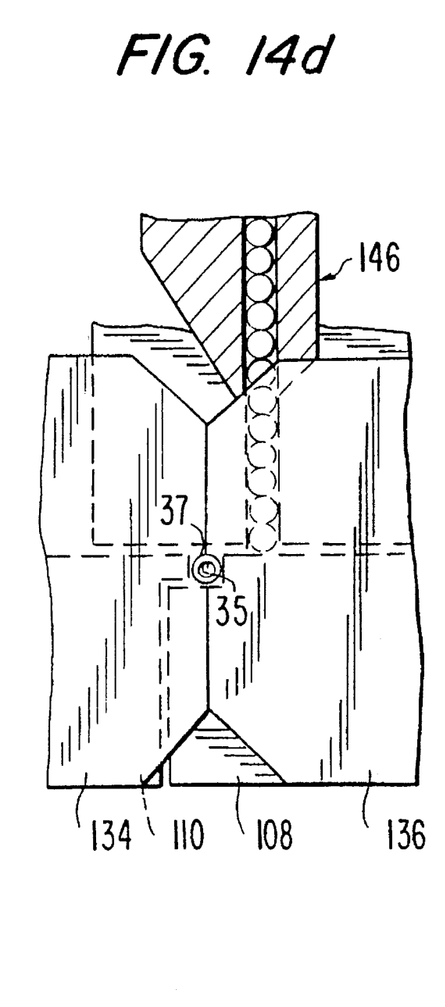
FIG. 14d is a view similar to FIG. 14c, illustrating the needle blank in the hole creating position gripped by both needle gripping jaws after creation of the hole.

Once the needle is completely positioned in the hole creating position, jaw assembly 102 closes, in response to upper secondary cam 104, so as to firmly maintain the needle in the hole creating position, as shown in FIG. 14d. Blocking system 100 retracts to allow the focus point of laser 12 to coincide with the center of the needle face 35.

Once blocking system 100 retracts the cycle of loading the needle has ended and clutch assembly 68 disengages causing the cam assemblies to cease rotating. A cycle end switch activates and sends a signal to control system 16 indicating the cycle has ended and a needle is in position. Preferably, as shown in FIG. 2, cycle end switch 168 is a proximity switch which is activated when cycle pin 170 rotates past proximity switch 168. Upon receiving the cycle end signal, control system 16 then activates unless, as noted above, needle detecting system 162 fails to detect the presence of a needle. Activation of laser 12 causes a laser beam to strike the needle, thereby creating a hole in the needle, having a predetermined length along the longitudinal axis thereof, as noted above.

It will be understood that various modifications can be made to the embodiments of the present invention herein disclosed without departing from the spirit and scope thereof. Therefore, the above description should not be construed as limiting the invention but merely as exemplifications of preferred embodiments thereof. Those skilled in the art will envision other modifications within the scope and spirit of the present invention as defined by the claims appended hereto.

What is claimed is:

1. An apparatus for presenting needle shanks to a device for creating a hole in a needle shank, which comprises:

a frame;

a shank guide secured to said frame and movable between a needle receiving position and a hole creating position;

a shank blocking member slidably secured to said frame and movable between a first position defining a predetermined distance from the hole creating device and a second position;

a shank pusher secured to said frame adjacent said hole creating position and movable with respect to said hole creating position, such that when said shank guide moves an end face of a needle shank to said hole creating position, said shank pusher is actuated to move the needle shank to abut said blocking member wherein the end face of the needle shank is positioned said predetermined distance from the hole creating device; and at least one pair of jaws positioned adjacent said hole creating position and movable between open and closed positions, said at least one pair of jaws having a needle shank gripping surface which releasably maintain the end face of the needle shank in the hole creating position.

2. The apparatus according to claim 1, wherein said guide member, said blocking member, said pusher member and said at least one pair of jaws move in a predetermined sequence, such that an end face of the needle shank is presented to the hole creating device at a rate of at least 1 Hz.

3. The apparatus according to claim 1, wherein the needle shank is substantially straight.

4. The apparatus according to claim 1, wherein at least said shank guide member is fabricated from an aluminum-bronze alloy.

5. The apparatus according to claim 1, wherein at least said shank guide member is fabricated from a lubricant impregnated material.

6. An apparatus for sequentially presenting an end face of a plurality of needle shanks to a device for creating a hole in each end face, which comprises:

a needle shank carriage movable between a needle receiving position and hole creating position;

a feeding mechanism positioned adjacent said needle shank carriage to sequentially present needle shanks to said needle shank carriage; and at least one pair of jaws positioned adjacent said hole creating position wherein at least one jaw of said at least one pair of jaws is movable relative to the other jaw to releasably maintain a needle shank in said hole creating position.

7. The apparatus according to claim 6, wherein said needle shank carriage moves between said needle receiving position and said hole creating position at a rate of at least 1 Hz.

8. The apparatus according to claim 6, wherein said needle shank carriage moves between said needle receiving position and said hole creating position at a rate of between about 1 Hz. and about 10 Hz. so as to present the end face of a plurality of needle shanks at a rate of at least 1 Hz.

9. The apparatus according to claim 6, wherein one of said at least one pair of jaws is stationary and the other is movable.

10. An apparatus for sequentially presenting needle shanks to a device for creating a hole in an end of each needle shank, which comprises:

a frame;

a shank guide secured to said frame and movable between a needle receiving position and a hole creating position;

a feeding mechanism positioned adjacent said shank guide, said feeding mechanism sequentially presenting needle shanks to said shank guide when said guide is in said needle receiving position;

a shank pusher secured to said frame and positioned in aligned communication with said hole creating position, said shank pusher being movable relative to said hole creating position; and a pair of jaws slidably secured to said frame adjacent said hole creating position and movable between open and closed positions;

wherein said feeding mechanism, said shank guide, said shank pusher, and said pair of jaws cooperate in sequence, such that needle shanks move from said feeding mechanism to said shank guide, and said shank pusher moves an end face of a needle shank within said hole creating position a predetermined distance from the hole creating device, said pair of jaws releasably maintain the needle shank in said hole creating position after said shank pusher moves the end face of the needle shank said predetermined distance.

11. The apparatus according to claim 10, wherein said shank guide and said pusher are movable in said sequence to present the end face of each needle shank at a rate of at least 1 Hz.

* * * * *